3,118,935
PREPARATION OF 1,2,4-BUTANE TRICARBOX-YLIC ACID FROM 3-CYCLOHEXENE-1-CARBOX-ALDEHYDE
John W. Lynn, Charleston, and Richard L. Roberts, Milton, W. Va., assignors to Union Carbide Corporation, a corporation of New York
No Drawing. Filed May 22, 1959, Ser. No. 814,988
2 Claims. (Cl. 260—530)

This invention relates to the production of 1,2,4-butanetricarboxylic acid. More particularly, this invention relates to an improved method of oxidizing 3-cyclohexene-1-carboxaldehyde to 1,2,4-butanetricarboxylic acid.

1,2,4-butanetricarboxylic acids are valuable compounds which are useful in numerous applications. These polybasic acids can be employed in the preparation of cross-linked polyesters for use in rigid polyester foams. Trialkyl ester derivatives of these polybasic acids are excellent plasticizers for polyvinyl halide resins. The acids are also useful as epoxy resin hardeners.

The literature is replete with methods for synthesizing 1,2,4-butanetricarboxylic acid. One of the earliest methods recorded involves the Michael condensation of methylene-succinic acid esters with malonic ester. A more recent publication discloses the preparation of 1,2,4-butanetricarboxylic acid by the condensation of acrylonitrile with 1,1,2-ethanetricarboxylic acid. The art methods are generally circuitous and uneconomical. In the investigation of synthesis methods which led to the instant invention, it was found that nitric acid oxidation of 3-cyclohexene derivatives appeared to be potentially the most attractive as a commercial method for producing 1,2,4-butanetricarboxylic acid.

Oxidation of 3-cyclohexene-1-carboxylic acid and 3-cyclohexene-1-carbonitrile to 1,2,4-butanetricarboxylic acid can be accomplished in a satisfactory manner; however, these starting materials are relatively expensive. The most economically attractive starting material is 3-cyclohexene-1-carboxaldehyde, which is readily available in excellent yield from the Diels-Alder condensation of butadiene with acrolein. It has been found, however, that the nitric acid oxidation of 3-cyclohexene-1-carboxaldehyde does not proceed satisfactorily by techniques which are successful with the corresponding 3-cyclohexene-1-carboxylic acid and 3-cyclohexene-1-carbonitrile derivatives. A poor yield of contaminated 1,2,4-butanetricarboxylic acid is produced.

Accordingly, it is a main object of this invention to provide an improved oxidation method for producing 1,2,4-butanetricarboxylic acid from 3-cyclohexene-1-carboxaldehyde. Other objects and advantages of this invention will become apparent from the accompanying specification and disclosure.

The objects of this invention are acomplished by a process which comprises (1) contacting 3-cyclohexene-1-carboxaldehyde with oxygen in the presence of a catalytic quantity of a metal salt selected from the group consisting of the salts of copper, silver and the transition elements, at a temperature between 10° C. and 75° C. until the reaction between said oxygen and said 3-cyclohexene-1-carboxaldehyde is substantially complete, (2) reacting the product mixture from said step (1) with nitric acid at a temperature between 40° C. and 80° C. to produce 1,2,4-butanetricarboxylic acid, said nitric acid being employed in a quantity between 5 and 20 moles for each mole of 3-cyclohexene-1-carboxaldehyde employed in the process.

The oxygen is employed in a quantity which is in excess of the stoichiometric amount required for the reaction with 3-cyclohexene-1-carboxaldehyde in the first step of the process. The oxygen is entered into the reaction medium at atmospheric pressure or at superatmospheric pressure. Pressures up to about 5000 p.s.i. are practical. The oxygen can be employed in the form of a substantially pure oxygen stream or it can be entered in the process as an oxygen-bearing gasiform stream such as air. Sparging the gasiform stream through the reaction mixture as an agitation means has the advantage of permitting better contact between the oxygen, 3-cyclohexene-1-carboxaldehyde and catalyst.

The reaction temperature for the first step of the process can vary between about 10° C. and 150° C., with the preferred temperature range being between 15° C. and 35° C. The reaction time varies over a broad range and is dependent on such variables as the reaction temperature and the kind and quantity of catalyst employed. Generally, the reaction is continued until the uptake of oxygen by the reaction mixture has ceased. Typical reaction periods are in the range between about one and twenty hours.

The copper, silver and transition element salts which are included as catalysts in the first process step are employed in a quantity betwen 0.01 and 0.5 weight percent, based on the weight of 3-cyclohexene-1-carboxaldehyde. A preferred weight of catalyst is between 0.1 and 0.2 weight percent. Typical catalysts which can be utilized include copper, silver, and transition metal element metal salts of acidic organic compounds such as cobalt acetate, cobalt naphthenate, cobalt oleate, cobalt linoleate, manganese acetate, manganese naphthenate, manganese oleate, manganese linoleate, and the analogous salts of silver, copper, iron, nickel, and the like; inorganic metal oxides such as cobalt oxide, silver oxide, copper oxide, manganese oxide, nickel oxide, and the like; metal salts of inorganic acids such as cobalt sulfate, cobalt halides, cobalt carbonate, cobalt phosphate, cobalt nitrate, manganese sulfate, manganese halides, manganese carbonate, manganese phosphate, manganese nitrate, and the analogous salts of silver, copper, iron, nickel, and the like.

Preferred among the catalysts are the salts of cobalt and manganese. Salts of cobalt are particularly effective as catalysts for this reaction.

An inert diluent is not required in the reaction mixture but one can be used if desired. Water is suitable for this purpose as are any solvents which are inert under the reaction conditions.

The crude reaction mixture obtained at the conclusion of the first process step is employed directly in the nitric acid oxidation step. In some cases, it may be desirable to strip 3-cyclohexene-1-carboxaldehyde from the reaction mixture if an excess quantity of the material remains unreacted in the mixture. However, in the normal performance of the process, it is preferred to permit residual 3-cyclohexene-1-carboxaldehyde from the first process step to carry over into the second process step where it will become oxidized to 1,2,4-butanetricarboxylic acid.

The second step of the process is conducted by mixing the reaction mixture from the first step with nitric acid at a temperature between about 40° C. and 80° C., with the preferred temperature range being between about 50° C. and 75° C. The nitric acid is employed in a mole ratio between about 5 and 20 moles of nitric acid for each mole of 3-cyclohexene-1-carboxaldehyde employed in the process, with between about 6 and 10 moles of nitric acid per mole of 3-cyclohexene-1-carboxaldehyde being the preferred molar ratio. The nitric acid is usually added as an aqueous solution containing between 40 percent and 90 percent by weight of nitric acid.

The reaction time can vary over a broad range between about 0.5 and 10 hours, depending on such factors as the nitric acid concentration, temperature and the presence or absence of a catalyst.

The nitric acid oxidation reaction proceeds without benefit of a catalyst. However, better results are obtained if some residual active catalyst is carried over in the re-action mixture from the first process step. Optimum results are obtained if between 0.01 and 1.0 weight percent of catalyst is added to the second step, based on the total weight of reactants, i.e., the weight of nitric acid and organic material being oxidized. The same type of catalysts employed in the first process step can be used in the second step. Preferred catalysts are those selected from the group consisting of ammonium and alkali metal vanadates and molybdates. These catalysts include ammonium vanadate, sodium vanadate, potassium vanadate, ammonium molybdate, sodium molybdate and potassium molybdate. It is particularly advantageous to include in the catalyst powdered copper metal or a copper salt in a quantity between about 0.01 to 1.0 weight percent, based on the total weight of the reactants. Suitable copper salts include cupric nitrate, cupric chloride, cupric phosphate, cupric oxide, copper sulfate, and the like.

When the nitric acid oxidation step of the process is conducted batchwise, it is convenient to initially charge the nitric acid, water and catalyst to the reaction vessel, and add the reaction mixture from the first step dropwise to the oxidation medium at a controlled rate. The process can be conducted in a continuous manner by charging a stream of aqueous nitric acid and catalyst mixture into the end of a tubular reactor simultaneously with the product stream from the first oxidation step and continuously removing reaction product mixture from the other end of the reactor after a suitable residence time, e.g., between two and four hours at a temperature between 50° C. and 75° C. The use of superatmospheric pressures during the nitric acid oxidation stage generally permits the use of more dilute nitric acid and a lower temperature in a given reaction series.

The nitrogen oxides which evolve during the oxidation reaction stage can be passed over an oxidation catalyst with air or oxygen to produce nitrogen dioxide which is, in turn, absorbed in a water scrubber as nitric acid. The nitric acid so produced can be concentrated and recycled to the nitric acid oxidation stage of the process.

Crystalline 1,2,4-butanetricarboxylic acid can be separated by several methods from the product mixture resulting from the nitric acid oxidation step of the process. In one method, the product mixture is cooled to a temperature sufficient to cause precipitation of solid 1,2,4-butanetricarboxylic acid out of solution. The cooling temperature is preferably between about 10° C. and −15° C. The cooling is continued until precipitation of crystals is no longer evident. A cooling period between about one hour and sixteen hours usually will suffice to complete the crystallization for a particular reaction mixture. The crystalline 1,2,4-butanetricarboxylic acid product is separated from the reaction mixture liquid phase by filtration or decantation and the like.

In another method, the crude reaction mixture is stripped of excess water and nitric acid by vacuum distillation, then the residuum is mixed with an alcohol such as ethanol, and, after ester product is formed by heat treatment, the crude reaction mixture is distilled and a 1,2,4-butanetricarboxylic acid product is recovered in the form of its ester. One advantage of this latter method of recovery is that by the use of a suitable alcohol or alcohol mixture a 1,2,4-butanetricarboxylate is obtained which has direct utility as a plasticizer for vinyl halide resins.

The process of this invention is superior in efficiency and economy to prior art oxidation methods for converting 3-cyclohexene-1-carboxaldehyde to 1,2,4-butanetricarboxylic acid. Formation of insoluble, polymeric materials and other side-reaction products is avoided by the invention process, and a high yield of good quality 1,2,4-butanetricarboxylic acid is consistently produced.

The following examples will serve to illustrate specific embodiments of the invention.

*Example 1*

An apparatus was assembled which consisted of a two-liter, four-neck reaction flask equipped with a thermometer, diffuser, straight-bore reflux condenser and a high-speed stirrer. The reaction temperature was regulated by external cooling as needed. The rate of inlet gas was measured by means of a flow-meter and the outlet gas was passed through the condenser to a flow-meter.

There was charged to the reaction flask, 3-cyclohexene-1-carboxaldehyde (550 grams, 5 moles), water (550 grams) and cobalt acetate (1.1 grams). The temperature was maintained at 20° C. and gaseous oxygen was diffused into the liquid at the rate of 880 milliliters per minute (air was employed in other experiments with equally good results). The reaction was continued for a period of three hours.

The crude product mixture (1136 grams) was charged to a still and unreacted 3-cyclohexene-1-carboxaldehyde was recovered by azeotropic distillation. Water and other volatile materials were removed by further distillation to a kettle temperature of 90° C. at a pressure of 50 millimeters of mercury. The recovered 3-cyclohexene-1-carboxaldehyde weighed 247 grams (2.25 moles).

The crude product residue which was recovered contained 62.8 percent of 3-cyclohexene-1-carboxylic acid (264 grams, 2.1 moles). A three-liter flask was charged with nitric acid (10 moles, 50 weight percent), ammonium metavanadate (0.1 percent by weight) and copper powder (0.25 percent by weight). The resultant mixture was warmed to a temperature of 50° C. and maintained in the range between 50° C. and 55° C. with external cooling while 252 grams of crude residue product from the first oxidation step (1.26 moles of 3-cyclohexene-1-carboxylic acid) was added dropwise over a period of one hour. The reaction mixture was stirred for an additional four hours at a temperature of 50° C. to 55° C., then it was stripped of excess water and nitric acid by two passes through a tubular flash evaporator. The concentrated product mixture was chilled to partially crystallize the 1,2,4-butanetricarboxylic acid product. The solid product was filtered from the reaction mixture, washed with ethyl ether and dried (140 grams, melting point 114° C. to 116° C.).

The filtrates from the crystallization and washing of the solid product were diluted with water, treated with activated carbon and again passed through the flash evaporator. The stripped concentrate was then esterified with an excess of ethanol in a conventional manner to yield 100 grams of distilled triethyl 1,2,4-butanetricarboxylate (boiling point 137° C. at 2.0 millimeters of mercury, and 143° C. at 2.5 millimeters of mercury; $n_D^{30}$ 1.4351.). This represented an 85 percent yield of contained 1,2,4-butanetricarboxylic acid, based on the 3-cyclohexene-1-carboxylic acid oxidized with nitric acid, and an overall efficiency of 65 percent from 3-cyclohexene-1-carboxaldehyde.

Manganese salts, e.g., manganese acetate, manganese benzoate, manganese carbonate, manganese sulfate, and the like, are effective catalysts for the step (1) air oxidation reaction described above.

*Example 2*

A charge of 3-cyclohexene-1-carboxaldehyde was oxidized in a manner similar to Example 1. The crude product mixture was stripped of unreacted 3-cyclohexene-1-carboxaldehyde, water, and other volatiles and a residue product mixture was recovered which contained 60 weight percent, 1.6 moles, of 3-cyclohexene-1-carboxylic acid. The product mixture (339 grams) was oxidized at a temperature of 50° C. to 60° C. with 13.5 moles of nitric acid (50 weight percent solution) for a reaction period of four hours. 1,2,4-butanetricarboxylic acid product was recovered as in the first example. The yield was 84.2 percent, based on the 3-cyclohexene-1-carboxylic acid contained in the crude starting material, and the overall efficiency was 59.8 percent from 3-cyclohexene-1-carboxaldehyde.

Example 3

A mixture of 3-cyclohexene-1-carboxaldehyde (24.95 moles) and cobalt naphthenate solution (1.0 percent by weight of a solution containing 6 percent by weight cobalt in an oil commonly used in the paint industry) was charged to a tubular stainless steel reactor (3" I.D. x 62" length) fitted with means for charging air under pressure and a means for discharging effluent gases through a pressure-maintaining valve. The reaction mixture was heated at a temperature of 102° C. to 140° C. for a period of eight hours while air was sparged through the reaction mixture at the rate of 317 liters per hour. During the reaction period, the exhaust valve was regulated so as to maintain an air pressure of 100 p.s.i.g. on the reaction system.

The crude reaction product was withdrawn from the bottom of the reactor and stripped of unreacted 3-cyclohexene-1-carboxaldehyde and other materials volatile at a temperature of 120° C. and a pressure of 1 millimeter of mercury. The residual product contained 24.05 weight percent of 3-cyclohexene-1-carboxylic acid.

A reaction flask was charged with a mixture of nitric acid (22.6 moles, 50 weight percent solution), ammonium metavanadate (0.1 percent by weight of reactants) and powdered metallic copper (0.25 percent by weight of reactants) and the mixture was warmed to a temperature of 50° C. The residue product from the air oxidation step was fed to the reaction mixture over a period of 1.7 hours. The reaction was continued an additional three and one-half hours after the feed period.

The recovered product mixture was passed twice through a tubular flash evaporator to remove excess water and nitric acid. The concentrated mixture was diluted with water, treated with activated carbon and passed through the flash evaporator twice to remove additional nitric acid. The mixture was then treated with ethanol in a conventional manner to prepare an ester derivative. Upon distillation of the ester mixture, triethyl 1,2,4-butanetricarboxylate was isolated which had a boiling point of 138° C. to 152° C. at 1.5 millimeters of mercury, and an $n_D^{30}$ of 1.4359.

Example 4

This example illustrates the poor results obtained when direct nitric acid oxidation of 3-cyclohexene-1-carboxaldehyde to 1,2,4-butanetricarboxylic acid is attempted.

A mixture of 70 percent nitric acid (25 moles), water (to dilute the nitric acid to 50 percent), and ammonium metavanadate (0.1 percent by weight of reactants) was charged to a reaction flask and heated to 40° C. Over a period of 6.25 hours, 3-cyclohexene-1-carboxaldehyde (5 moles) was charged to the stirred mixture, while applying external cooling to remove the heat of reaction and maintain a reaction temperature of 40° C. to 50° C. During the early stages of the feed period, extreme difficulty was experienced in initiating the exothermal reaction. When reaction was eventually initiated, it became uncontrollable, resulting in rapid rise of reaction temperature and consequent loss of some reaction mixture. In addition to the difficulty encountered with control of the reaction rate, a considerable quantity of polymeric material was formed in the reaction vessel, making agitation very difficult.

After the feed was completed, the reaction mixture was held at 40° C. to 50° C. for an additional four hours, filtered to remove insoluble salts and polymeric material, and passed through a steam-heated, tubular vapor-lift evaporator under reduced pressure (about 20 millimeters of mercury) to remove most of the unreacted nitric acid and excess water. The concentrated product mixture was chilled to crystallize the contained 1,2,4-butanetricarboxylic acid, which was removed by filtration and recrystallized from an acetone-benzene mixture. There was recovered from the recrystallization 305 grams of dry, crystalline product acid (purity by titration, 94 percent; melting point, 106° C. to 112° C.), a yield of 30.2 percent of the theoretical, based on the aldehyde charged.

What is claimed is:

1. A method for producing 1,2,4-butane-tricarboxylic acid in a sequence of reaction steps consisting essentially of (1) reacting 3-cyclohexene-1-carboxaldehyde with elemental oxygen in the presence of between 0.01 and 0.5 weight percent, based on the weight of 3-cyclohexene-1-carboxaldehyde, of a catalyst selected from the group consisting of cobalt acetate, cobalt naphthenate, cobalt oleate, cobalt linoleate, cobalt oxide, cobalt sulfate, cobalt halides, cobalt carbonate, cobalt phosphate, cobalt nitrate, manganese acetate, manganese naphthenate, manganese oleate, manganese linoleate, manganese oxide, manganese sulfate, manganese halides, manganese carbonate, manganese phosphate, manganese nitrate and manganese benzoate, at a temperature between 10° C. and 75° C. until reaction between said oxygen and said 3-cyclohexene-1-carboxaldehyde is substantially complete to form a crude reaction product mixture containing 3-cyclohexenecarboxylic acid, recovering unreacted 3 - cyclohexene-1-carboxaldehyde therefrom and (2) reacting said reaction product mixture with nitric acid, said nitric acid being employed in a quantity of from 6 to 10 moles inclusive for each mole of 3-cyclohexene-1-carboxaldehyde originally introduced, at a temperature between 40° C. and 80° C. in the presence of between 0.01 and 1.0 weight percent based on the total weight of reactants, of a catalyst selected from the group consisting of ammonium vanadate, alkali metal vanadate, ammonium molybdate and alkali metal molybdate.

2. The process as claimed in claim 1 wherein the catalyst in step (1) is cobalt acetate and the catalyst in step (2) is ammonium metavanadate, to which, in addition, there has been added between 0.025 and 0.25 weight percent, based on the total weight of reactants, of a catalyst selected from the group consisting of copper, cupric nitrate, cupric chloride, cupric phosphate, cupric oxide and copper sulfate.

References Cited in the file of this patent

UNITED STATES PATENTS

| | | |
|---|---|---|
| 1,934,161 | Barsky | Nov. 7, 1933 |
| 2,203,628 | Hopff et al. | June 4, 1940 |

FOREIGN PATENTS

| | | |
|---|---|---|
| 1,113,852 | France | Apr. 5, 1956 |
| 688,344 | Great Britain | Mar. 4, 1953 |
| 769,270 | Great Britain | Mar. 6, 1957 |